United States Patent [19]

Wietelmann et al.

[11] Patent Number: 5,178,111

[45] Date of Patent: Jan. 12, 1993

[54] SYSTEM FOR THE CLOSED-LOOP CONTROL OF A POSITIONING UNIT IN A MOTOR VEHICLE

[75] Inventors: Jürgen Wietelmann, Ditzingen; Roland Karrelmeyer, Neckarsulm, both of Fed. Rep. of Germany

[73] Assignee: Robert Bosch GmbH, Stuttgart, Fed. Rep. of Germany

[21] Appl. No.: 728,629

[22] Filed: Jul. 11, 1991

[30] Foreign Application Priority Data

Aug. 16, 1990 [DE] Fed. Rep. of Germany ....... 4025847

[51] Int. Cl.$^5$ ............................................. F02M 39/00
[52] U.S. Cl. .................................. 123/357; 123/479
[58] Field of Search ................ 123/357, 358, 359, 494

[56] References Cited

U.S. PATENT DOCUMENTS

| | | | |
|---|---|---|---|
| 4,279,229 | 7/1981 | Arnold | 123/357 |
| 4,492,196 | 1/1985 | Oshizawa | 123/357 |
| 4,534,328 | 8/1985 | Fischer | 123/479 |
| 4,541,380 | 9/1985 | Oshizawa | 123/357 |
| 4,653,447 | 3/1987 | Linder | 123/357 |
| 4,667,633 | 5/1987 | Stumpp et al. | 123/357 |
| 4,708,112 | 11/1987 | Nanjyo | 123/357 |
| 4,730,586 | 3/1988 | Yamaguchi | 123/357 |
| 4,793,308 | 12/1988 | Bräuninger | 123/479 |

*Primary Examiner*—Carl S. Miller
*Attorney, Agent, or Firm*—Kenyon & Kenyon

[57] ABSTRACT

A system for the closed-loop control of a positioning unit in a motor vehicle with the system's loop controller supplying a signal to the positioning unit dependent upon a comparison between a predetermined-value signal and an actual-position signal. The predetermined-value signal depends upon the desired position of the positioning unit and upon the output signal from a signal-forming device. Based upon the predetermined-value signal and by simulating the control loop, a simulator generates an estimation signal for the actual-position signal. This estimation signal influences the response characteristic of the signal-forming device.

20 Claims, 5 Drawing Sheets

SYSTEM FOR THE CLOSED-LOOP CONTROL OF A POSITIONING UNIT IN A MOTOR VEHICLE

FIELD OF THE INVENTION

The present invention relates to a system for closed-loop control of a positioning unit in a motor vehicle.

BACKGROUND OF THE INVENTION

German Published Patent Application No. 38 25 138 describes a method and device for adaptively determining positioning unit. The device includes a controller for controlling the position of a quantity-determining positioning unit in a diesel gasoline engine. The device adjusts the position of the quantity-determining positioning unit to a predetermined value. This predetermined value is fed to the input of the loop controller, via a signal-forming device.

The signal-forming device can be located in a predetermined-signal line or in a branch line. The predetermined signal is combined with a signal which is dependent on the output signal from a setter.

Unfavorable loop-controller characteristics result under certain operating conditions. In particular, in the closed-loop control of friction-encumbered electromechanical positioning systems, the static or sliding friction in the system causes dynamic losses in the low-level signal, i.e., small modifications of the predetermined value. Similar problems are encountered in other positioning units, such as in a throttle-valve-control unit.

It is an object of the present invention to achieve an optimum control response under all operating conditions, in a system for controlling a positioning unit in a motor vehicle, and to improve the dynamic response of the system without decreasing the stability of the closed control loop.

SUMMARY OF THE INVENTION

The present invention is a system for closed loop control of a positioning unit of a motor vehicle. According to the present invention, the dynamic response of friction-encumbered electromechanical positioning systems is considerably improved with respect to low-level signals. This is done without decreasing the stability of the closed control loop. The system of the present invention also provides that for both low-level signals and high-level signals, the quantity-determining positioning unit can be adjusted to a predetermined value without any overshoot and with a high dynamic response.

DETAILED DESCRIPTION OF THE INVENTION

The system according to the present invention is described using a quantity-determining positioning unit for a diesel-fuel pump. However, the system can also be used with other friction-encumbered positioning units, in particular with electromagnetic positioning units. Thus, for example, it is possible to use the system for the closed-loop control of a throttle-valve control element.

Figure 1A:
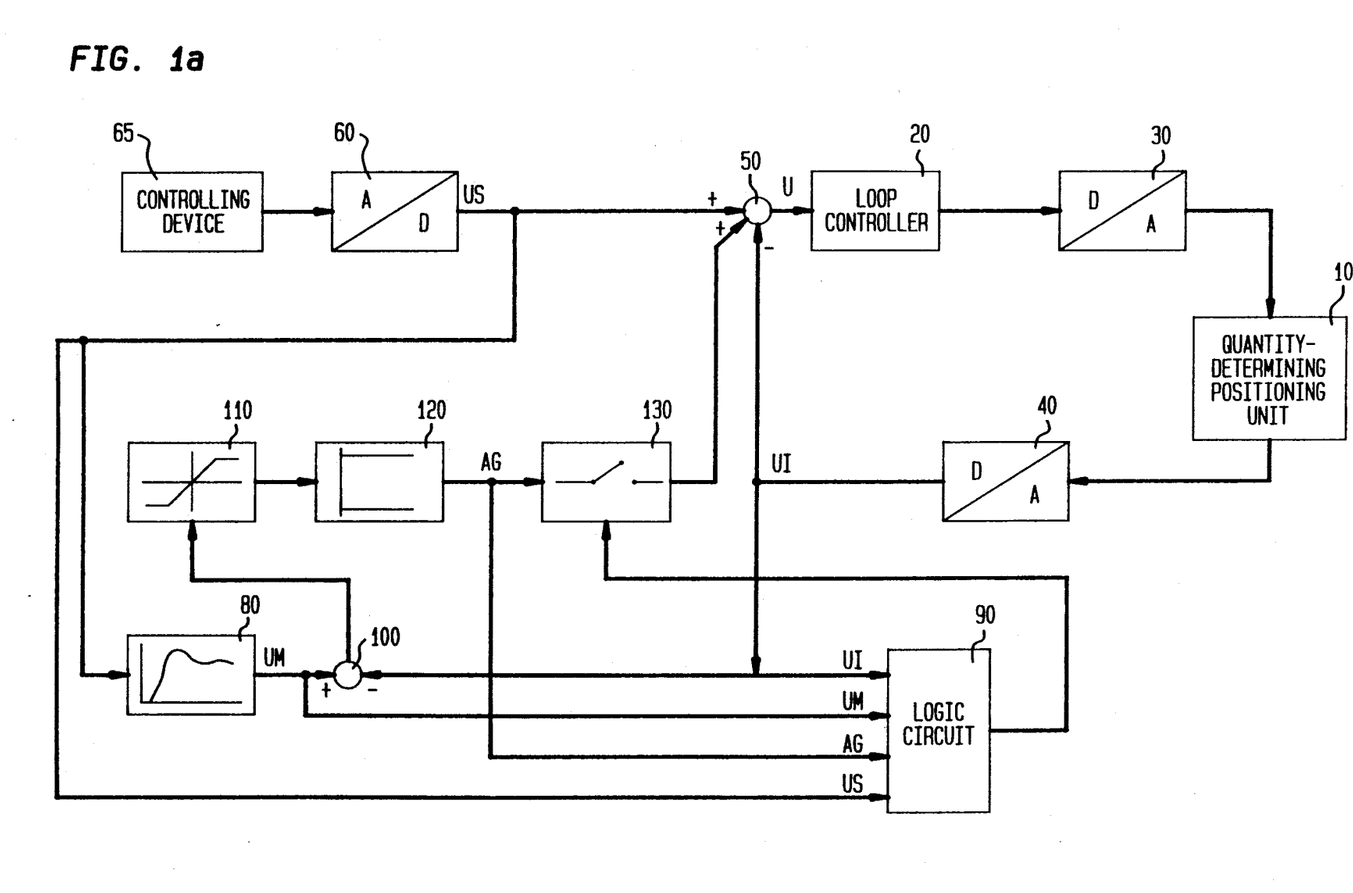
FIG. 1a is a block diagram of a first embodiment of the closed-loop control system according to the present invention.

FIG. 1a shows a block diagram of a first embodiment of the closed-loop control system according to the present invention. A quantity-determining positioning unit 10 is coupled to a loop controller 20. An actual-position signal UI, which indicates the actual position of the positioning unit, is fed to the loop controller 20 via a first adder 50. Because the positioning unit preferably requires analog control signals, two digital-to-analog converters 30, 40 are needed when the loop controller 20 has a digital design.

A predetermined signal US from a predetermined-controlling device 65 is fed to adder 50 via an analog-to-digital converter 60. In addition, the signal US is fed to a simulator 80 and an injection logic circuit 90.

The output signal UM from the simulator 80 is fed to the logic circuit 90 and as the first input to a second adder 100. The actual-position signal UI is applied with a minus sign to the second input of the second adder 100. Signal UI is also applied to a further input of the logic circuit 90. Via a limiter 110 and an amplifier 120, the output signal from adder 100 is fed as an injection signal AG to both the logic circuit 90 and a switching device 130.

The injection signal AG from the amplifier 120 is fed to adder 50 depending on the position of the switching device 130. Because the position of the switching device 130 depends on the output value of the logic circuit 90, the switching device 130 is coupled to the output of the logic circuit 90.

The loop controller 20 causes the positioning unit 10 to assume a position which corresponds to the signal US output by the controlling device 65. When the switching device 130 is in the open position, adder 50 produces a differential signal U, which corresponds to the difference between the predetermined signal US and the actual position signal UI.

The output of the loop controller 20 is based upon the differential signal U, and is fed to the positioning unit 10 via the digital-to-analog converter 30.

The positioning unit 10 used in this system is usually friction-encumbered. The static or sliding friction occurring in electromechanical positioning systems leads to dynamic losses in the high-level signal when the corresponding loop-controller design is stable. The result of such a loop-controller design is that small changes in the predetermined signal US lead to small changes in the output of the loop controller 20. The positioning unit 10 reacts to these changes only after a delay or not at all, because small positioning forces are not enough to overcome the static friction. To avoid these disadvantages, an injection signal AG is added to the predetermined signal US at adder 50. Because this additional injection signal AG is required only under certain operating conditions, a switching device 130 is coupled between the amplifier 120 and adder 50.

The injection signal AG is formed by a signal-forming device, hereinafter referred to as a "setter." The setter includes the logic circuit 90, the limiter 110, the amplifier 120 and the switching device 130. From the signal US, the simulator 80, which simulates the closed control loop, generates an estimation signal UM for the actual position of the positioning unit 10. The estimation signal UM determines the output of the setter.

When the control loop has a good dynamic response, the output UM of the simulator 80 corresponds approximately to the output UI of the closed control loop. The simulator 80 calculates the output signal of the unit to be simulated based upon only the input signal of the unit.

When the control loop has a poor dynamic response, signals UI and US deviate from one another, the actual-position signal UI usually being smaller than the predetermined signal US. The difference between the output UM of the simulator 80 and the actual-position signal UI is a measure of the actual dynamic response of the control loop. From adder 100, this differential signal between the output UM of the simulator 80 and signal UI is fed to the amplifier 120 via the limiter 110. The differential signal is limited in limiter ii0 and amplified in amplifier 120.

The injection signal AG formed by means of the limiter 110 and the amplifier 120 is fed to adder 50 via the switching device 130. At the same time, the injection signal AG is fed to the injection logic circuit 90. Therefore, the injection signal AG serves as a criterion for deciding whether injection will take place.

The switching device 130 is switched into the closed position in response to the output signal from the injection logic 90. Injection depends essentially on the following criteria. Injection is enabled only when the predetermined value for the control loop is altered by a minimum amount. This alteration can be spread over several sampling steps. The introduction of a dead zone prevents the injection from being activated through pure bit noise. If the control-loop dynamic response does not achieve the reference dynamic response specified by the simulator 80 due to the effects of friction, the injection signal AG is fed to adder 50. If the control-loop dynamic response is adequate, no injection takes place.

Injection continues until the actual position signal UI of the positioning unit matches the output signal UM of the simulator 80 or the signal UI matches the signal US. A renewed activation of injection is possible only when there is a change in the predetermined value.

The injection logic 90 contains a monitoring device which prevents an injection when the system does not show any friction. Thus, interference excitation can reduce friction. Furthermore, as of a certain rotational speed, the friction in the positioning unit 10 is reduced to the point where no more injection is needed.

Figure 2:
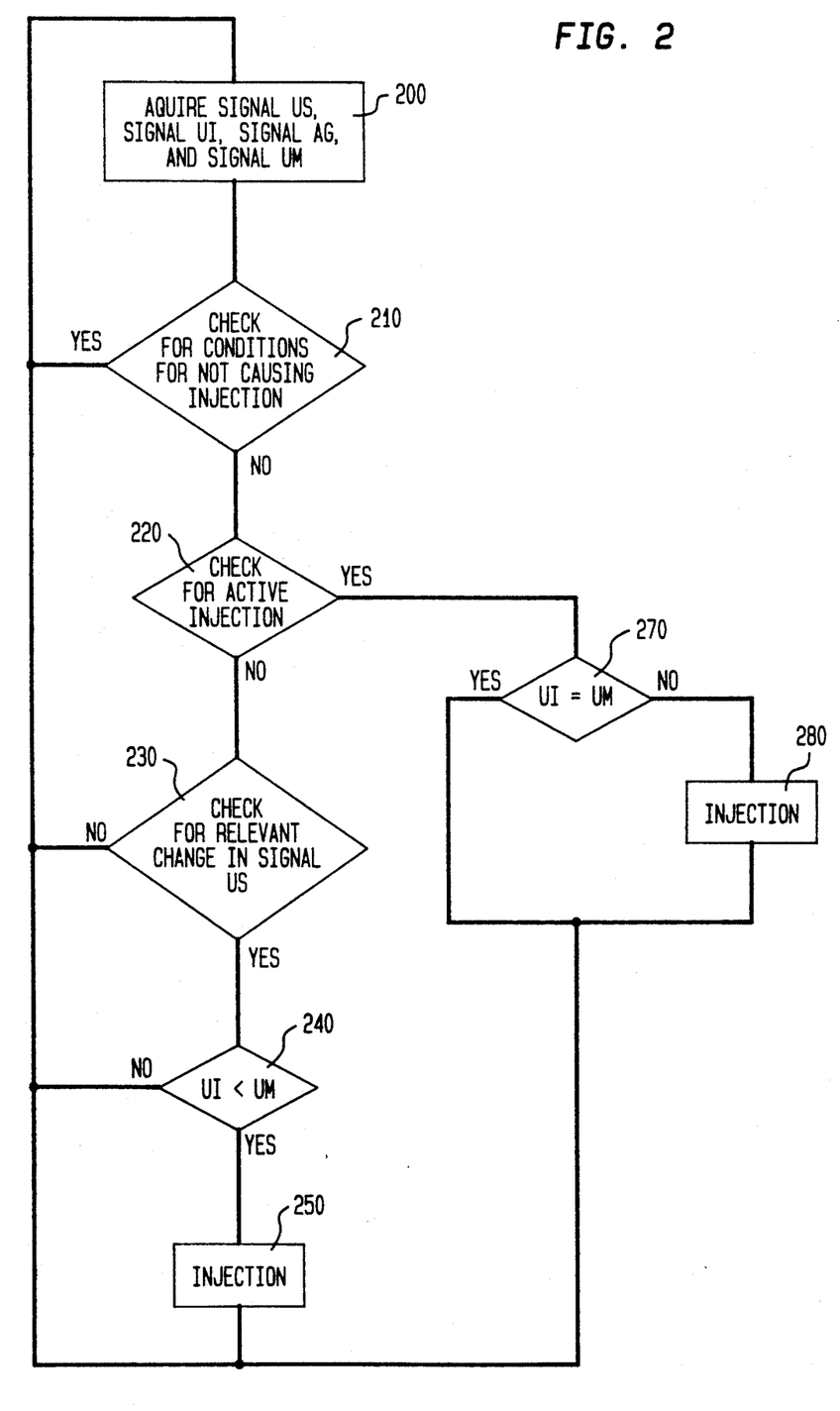
FIG. 2 is a flow chart of the operation of the system shown in FIG. 1.

The operation of the system with injection according to the present invention is illustrated in the flow chart of FIG. 2. The predetermined signal US, actual-position signal UI of the loop controller, injection signal AG, and estimation signal UM are acquired in a first step 200. A test follows in a first inquiry unit 210 to check whether operating conditions which do not call for an injection exist. If such conditions exist, an injection is prevented.

Interference excitation can reduce the influence of friction. In such cases, injection is not necessary. As of a certain rotational speed, the effect of friction is greatly reduced. If the rotational speed N lies above a threshold NS, no injection is necessary. Interference excitation can also be recognized by evaluating the signal UI. If the signal UI fluctuates continuously around an average value, the positioning unit is being positioned and, therefore, there is no static friction. To recognize these fluctuations, the signal UI is differentiated in order to eliminate its DC component. Control areas are subsequently calculated by means of integration with respect to an absolute value. The integration is extended over a fixed observation interval. If this integrated value X exceeds a specified threshold XS, there are instances of interference excitation. The threshold XS is formed by subjecting the output signal UM of the simulator 80 to the same control-area calculation. If the control area X of the signal UI is smaller than the control area XS of the output signal UM from the parallel model 80, the injection is enabled. If the control area X of the signal UI is greater than double the control area XS of the output signal UM from the simulator 80, the injection is prevented.

A second inquiry unit 220 decides whether the injection is active. If the injection is not active, the switch device 130 is open and another inquiry unit 230 follows. This inquiry unit 230 performs a test to check if a relevant change in the signal US is known. This inquiry prevents the injection from being activated as the result of pure bit noise.

Preferably, this inquiry takes place in a way which allows the signal US to be differentiated if the derivative DUS of the signal US exceeds a threshold DS. To detect small changes in the signal US spread out over a larger time interval, the derivative values formulated per sampling step are added together. If this sum value exceeds the preselected threshold value, the injection is likewise enabled. Therefore, an injection follows only when the signal US changes within a certain time period more than a specified amount. If this is the case, the system performs a third inquiry 240. If not, i.e., if the decision is made that no injection is necessary, the operation is repeated, starting with step 200.

The inquiry unit 240 assesses the dynamic response of the control loop. To make this assessment, the dynamic response of the control loop is compared to that of the simulator 80. The simulator 80 generates an estimation signal UM as large as the actual-position signal UI, in the case of a good dynamic response. If the signal UI of the control loop is smaller than the output signal from the simulator 80, the dynamic response of the control loop is not sufficient, in which case, the injection is activated in step 250. If, after that, the actual-position signal UI of the control loop attains the same value as the output signal UM from the parallel model 80, the dynamic response of the control loop is sufficient, in which case, the injection is deactivated. A renewed activation of the injection takes place only when a renewed, relevant change in the signal US occurs.

Instead of comparing two signal to determine whether an injection is appropriate, the injection signal AG can be evaluated. In such a case, an injection takes place only when the injection signal AG exceeds a threshold value AS.

The injection is activated in step 250. The logic circuit 90 outputs a signal, which causes the switching device 130 to route the injection signal AG to adder 50.

If the inquiry 220 reveals that the injection is already active, then a test follows in the inquiry unit 270 to check if the actual-position signal UI reaches the output signal UM from the simulator 80. If it does not, the injection remains active. If the signal UI reaches the output signal UM from the simulator 80, the logic circuit 90 changes its output signal so that the injection signal AG no longer reaches adder 50.

Figure 1B:
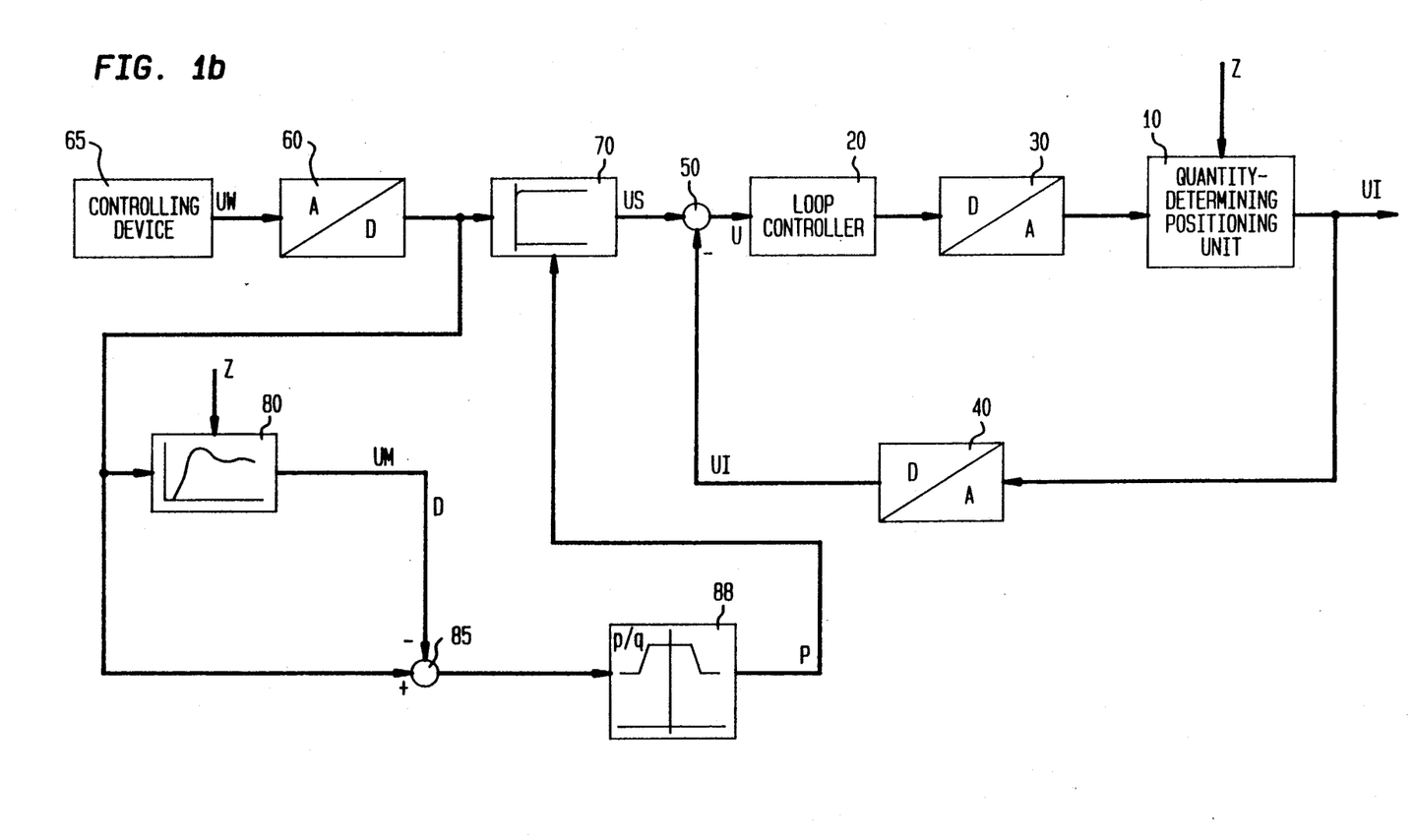
FIG. 1b is a block diagram of a second embodiment of the closed-loop control system according to the present invention.

A block diagram of a second embodiment of the closed-loop control system according to the present invention is shown in FIG. 1b. Various external disturbance variables Z affect the positioning unit 10. If need be, this positioning unit 10 receives a signal fed by the loop controller 20 via the digital-to-analog converter 30. The actual position of the positioning unit depends upon this signal and the various disturbance variables. This actual position is fed back as the actual-position signal UI with a minus sign to a first adder 50. The digital-to-analog converter 40 is coupled between the positioning unit 10 and the first adder 50. Adder 50 calculates the system deviation for the loop controller 20.

The predetermined signal US for the loop controller 20 is applied to adder 50. This signal US is dependent upon the desired position UW of the positioning unit 10. As a function of various operating parameters, the controlling device 65 delivers the signal UW. The controlling element 65 uses a signal which is dependent upon a gas-pedal position to calculate the desired position UW of the positioning unit 10.

Whether or not the analog-to-digital converter 40 or the digital-to-analog converter 60 is necessary depends upon whether the controlling device 65 and the loop controller 20 have a digital or analog design. The signal UW is fed to a first input of a setter 70, the output signal US of which represents the predetermined value for the loop controller 20. A second input of the setter 70 is for indicating whether the response characteristic of the setter 70 can be externally influenced.

The signal UW is directed via the simulator 80, as well as directly, to a second adder 85. The simulator 80 simulates the control loop, which includes the loop controller 20 and the positioning unit 10. The signal UM, which simulates the actual position of the positioning unit, appears at the output simulator 80. A pseudo system deviation signal D, which simulates the system deviation and the input signal of the loop controller 20, is applied to the inputs of adder 85. This pseudo system deviation D is fed as an input to a multiplier 88, in which the parameters p or p/q, which determine the response characteristic of the setter 70, are stored. For this purpose, the multiplier 88 is coupled to the setter 70.

Preferably, the closed-loop control system, including the loop controller 20 and the positioning unit 10, is designed so that the control loop in the low-level signal (i.e., small system deviation) demonstrates a maximum dynamic response, where no, or very little, overshooting occurs. The result of this design is that in the high-level signal (i.e., large system deviation), a non-linear loop controller tends to overshoot. Thus, when there are sudden, marked changes in the desired position UW of the positioning unit 10, the system deviation can cause the output signal from adder 50 to change considerably.

This causes the loop controller 20 to output a large signal, and a great deal of energy is fed to the control loop. To overcome the friction, a considerable supply of energy is necessary. If the friction is overcome, only little energy is needed to cause a change in the position of the positioning unit 10. The loop controller 20 outputs only an altered signal when the position of the positioning unit 10 changes. Up until this moment, energy is supplied to the positioning unit 10. This substantial energy supply causes the positioning unit 10 to change its position considerably after the friction is overcome. The positioning unit 10 thereby can occupy a position which is different than the desired position UW. This causes the closed-loop control system to overshoot. To avoid this overshooting, the desired position signal UW is modified by means of the setter 70. If there is a sudden rise in the desired position UW, the full signal modification is not routed to adder 50.

Because the system tends to overshoot when substantial changes in the desired position UW of the positioning unit 10 occur suddenly, the setter 70 primarily demonstrates PTI (i.e., first order, time-delay) action. That is, it passes on the change with delay.

When there are sudden changes, the signal US adapts only slowly to the modified value. The result is that the closed-loop control system does not overshoot. However, when there are small changes in the desired signal, the reaction to the changes is not immediate, and the dynamic response of the system deteriorates. In this case, it is necessary for the signal US to change quickly. This is achieved, for example, by means of an appropriate setter 70. Such a setter 70 can demonstrate PDT1 action, or proportional (P) action, i.e., depending upon the system deviation, the response of the setter 70 demonstrates different characteristics. For this purpose, the parameters p or the ratio of the parameters p/q depend upon the system deviation in the multiplier 88.

If the actual system deviation, which is applied to the output of adder 50, is used, this system deviation is already dependent upon the setter 70. To avoid this, a pseudo system deviation D is formed by means of the simulator 80. The simulator 80 simulates the closed control loop, which includes the loop controller 20 and the positioning unit 10. Based upon the signal UW, the simulator 80 calculates an output signal. In the ideal case, this output signal corresponds to the actual position UI of the positioning unit. The pseudo system deviation D results from the difference between the signal UW and the output signal UM from the simulator 80.

The parameters of the setter 70 then reach the multiplier 88 dependent upon this pseudo system deviation D. For pseudo system deviations D which are small (in terms of absolute value), p/q assumes greater values than for pseudo system deviations which are large (in terms of absolute value). It is particularly advantageous when these parameters depend not only upon the pseudo system deviation D, but also on other operating parameters, such as temperature values. The setter 70 and multiplier 88 can likewise be described as adaptive reference setters.

Figure 3:
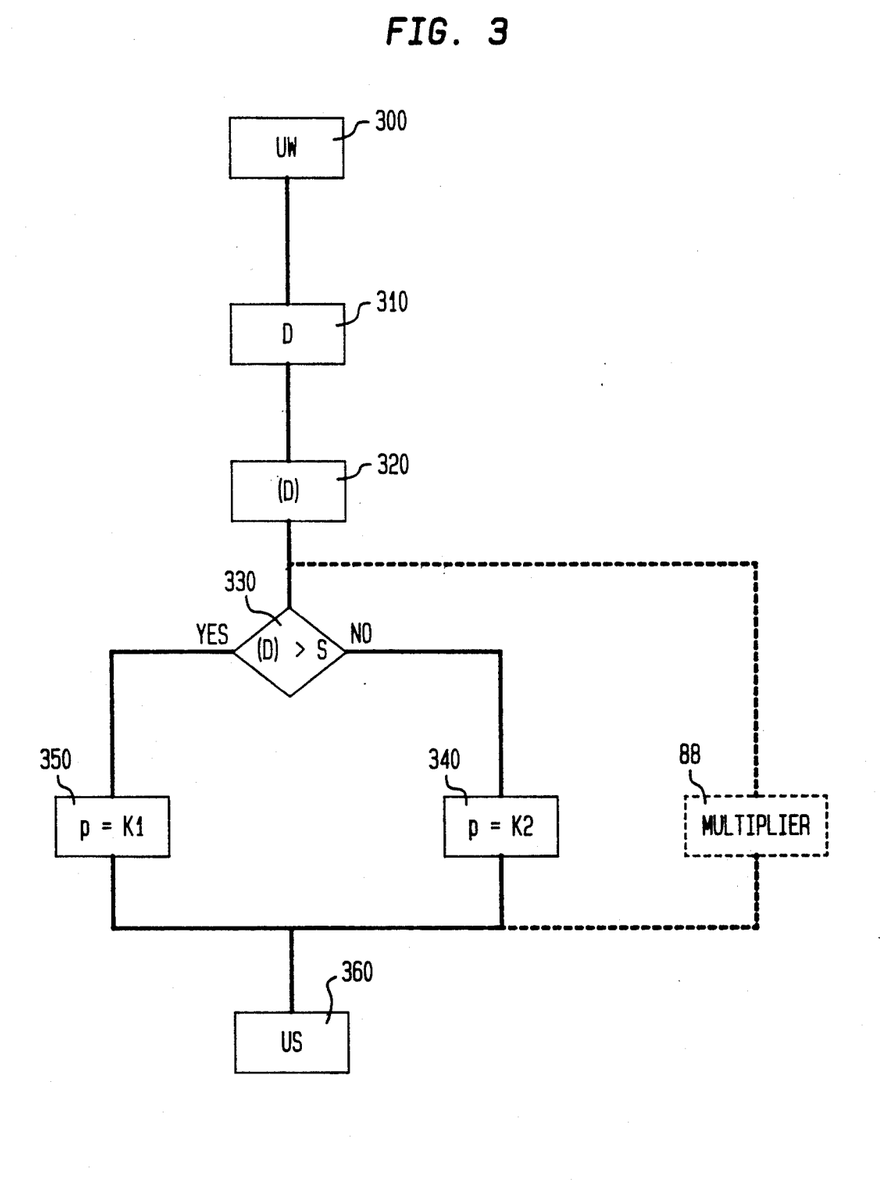
FIG. 3 is a flow chart of the operation of the system shown in FIG. 1b.

The flow chart of FIG. 3 illustrates the operation of the system with a setter having a variable response characteristic according to the present invention. The desired position UW of the positioning unit 10 is calculated by the controlling device 65 in step 300. In a second step 310, the simulator 80 determines the signal UM, and the pseudo system deviation D. The absolute-value generator 320 calculates the absolute value, $|D|$, of the pseudo system deviation D.

Dependent upon the magnitude of the absolute value $|D|$ of the pseudo system deviation D, the decision step 330 selects a constant K1 or a constant K2 for the setter 70. When the pseudo system deviation D is greater than a threshold S, a proportionality constant p of the setter 70 is set to the value KI in step 350. On the other hand, when the pseudo system deviation D is less than the threshold S, the proportionality constant p is set to the value K2 in step 340.

It is also advantageous when the inquiry unit 330 is more finely structured; for example, such that different proportionality constants p are selected for several ranges of the pseudo system deviation D. It is particularly advantageous, when in place of the steps 330, 340 and 350, a multiplier 88 is used. The multiplier 88 contains the proportionality constant p or the ratio p/q. In the step 360, the setter 70 generates the signal US for the subsequent positioning dependent upon the proportionality constant p.

Figure 4A:
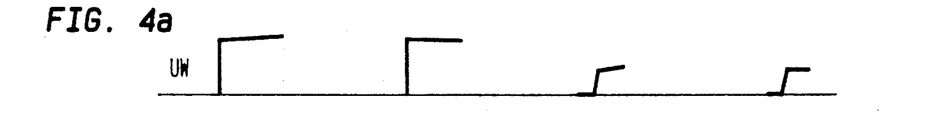
FIGS. 4a–c show graphs of the various flow chart signals as a function of time.
Figure 4B:
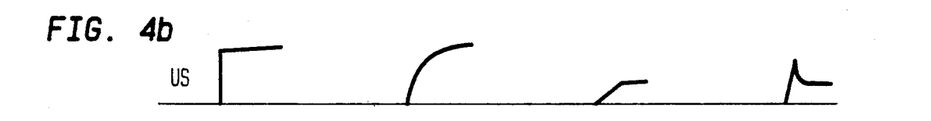
Figure 4C:
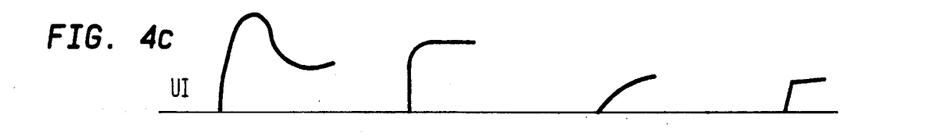

In FIG. 4, the desired position UW of the positioning unit 10, the signal US for the loop controller 20, and the actual position UI of the positioning unit 10 are plotted as a function of time, under various conditions. Preferably, the loop controller 20 is designed so that it immediately reacts to small system deviations (i.e., a low-level signal). Such small system deviations are based on small changes in the signal US or on small disturbances Z, which cause a change in the signal UI.

FIG. 4a shows, in a first time instant, that the signal UW experiences a rapid, marked change (i.e., a high-level signal). If the system does not contain a setter, a corresponding sudden change results for the signal US. The loop controller 20 is designed to attempt to quickly compensate for small changes. In systems without a setter, this would lead to overshooting in the high-level signal.

If a setter is used with delay action, e.g., a PTI element with significant delay, signal US would react only to a sudden, marked change in the signal UW with delay, as shown in FIG. 4b, in a second time instant. In this manner, the overshooting can be avoided as shown in FIG. 4c, in the second time instant. The positioning unit 10 assumes the new desired position relatively quickly.

Such a setter, however, causes a poor dynamic response in the low-level signal. If the signal UW changes only by a small amount as shown in a third time instant in FIG. 4a, this small change is still delayed by the setter. The result is that the new position of the positioning unit is established very slowly, as shown in the third time instant in FIG. 4c. Therefore, as a result of this setter, a poor dynamic response results from the low-level signal.

This poor dynamic response can be improved with the system according to the present invention. With a proper setter response characteristic, the actual position signal UI is shown in a fourth time instant in FIG. 4c. From a slightly modified signal, the setter generates a signal which corresponds approximately to that of FIG. 4b in the fourth time instant. The result is that the positioning unit 10 immediately assumes its new position without any overshoot.

Depending upon whether there is a slight or substantial change in the signal US, it is necessary for the setter to have variable transfer functions. In the system according to the present invention, the response characteristic of the setter is dependent upon the pseudo system deviation D. Dependent upon the pseudo system deviation D, which simulates the input signal of the loop controller 20, a variable response characteristic is specified for the setter.

Figure 5:
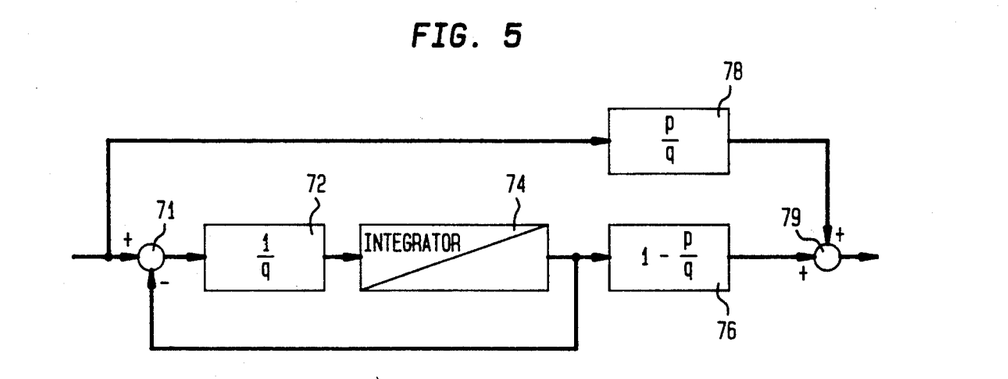
FIG. 5 is an embodiment of a portion of the system shown in FIG. 1b.

An embodiment of the setter 70 of FIG. 1b is shown in FIG. 5. Via a first adder 71, the input signal shown is fed to a first multiplier 72 and subsequently to an integrator 74. The output signal from the integrator 74 is fed back with a minus sign to a first adder 71, and, in addition, fed to a second multiplier 76. Furthermore, the input signal is fed to a second adder 79 via a third multiplier 78. The output signals from multipliers 76 and 78 are added in adder 79. The output of adder 79 is the output signal from the setter. The first multiplier 72 contains the multiplicative constant 1/q. The second multiplier 76 contains the multiplicative constant 1 - p/q. The third multiplier 78 contains the multiplicative constant p/q. Overall, therefore, the transfer function G(s) of the setter is given by the formula:

$$G(s) = (1 + p^*s)/(1 + q^*s) \quad (1)$$

Because the quantity p is variable while the quantity q remains fixed, the response characteristic of the setter is able to be altered without its intrinsic dynamic response changing. For a pseudo system deviation D, which is small in terms of absolute value, a value greater than or equal to one results from the multiplier 88 for the ratio p/q, in which case, the setter has lead action performance characteristics. When p/q is considerably greater than one, there is nearly PDTI action. For a pseudo system deviation D, which is large in terms of absolute value, a small value results from the multiplier 88 for the ratio p/q, in which case, the setter has lag response. When p/q equals zero, there is nearly PTI action. When p equal q, P response results for the setter.

The present invention provides both a system with injection according to FIG. 1a and a system with a variable setter according to FIG. 1b. A particularly advantageous system results when a system includes both features, i.e., injection and a variable setter. In other words, the signal US is fed to the loop controller via the setter 70 with a variable response characteristic, and an injection signal AG is added to the predetermined signal US and/or the actual-position signal UI.

We claim:

1. A system for the closed-loop control of a positioning unit in a motor vehicle, comprising:

a loop controller coupled to the positioning unit, the loop controller providing a first signal to the positioning unit, the first signal depending upon an injection signal and a comparison between a second signal and a third signal, the second signal depending upon the desired position of the positioning unit, the third signal representing the actual position of the positioning unit;

a signal-forming device coupled to the loop controller, the signal-forming device forming the injection signal dependent upon a pseudo system deviation, the pseudo system deviation being the difference between the second signal and the fourth signal; and a simulator coupled to the signal-forming device, the simulator receiving the second signal and providing a fourth signal, the fourth signal being an estimation of the actual position of the positioning unit.

2. The system as recited in claim 1, wherein the simulator simulates the loop controller and the positioning unit.

3. The system as recited in claim 1, wherein a transfer characteristic of a signal-forming device depends upon the absolute value of the pseudo system deviation.

4. The system as recited in claim 3, wherein, when the absolute value of the pseudo system dedication is greater than a predetermined value, the transfer characteristic of the signal-forming device demonstrates PT1 action.

5. The system as recited in claim 3, wherein when the absolute value of the pseudo system deviation is less than a predetermine value, the transfer characteristic of the signal-forming device demonstrates PDT1 action.

6. The system as recited in claim 3, wherein the transfer function of the signal-forming device is given by the formula $G(s)=(1+p*s)/(1+q*s)$, with p being a variable depending upon the pseudo system deviation, and q being a constant.

7. A system for the closed-loop control of a positioning unit in a motor vehicle, comprising:
   a loop controller coupled to the positioning unit, the loop controller providing first signal to the positioning unit, the first signal depending upon a fifth signal and a comparison between a second signal and a third signal, the second signal depending upon a desired position of the position unit, the third signal representing the actual position of the positioning unit;
   a signal-forming device coupled to the loop controller, with the signal-forming device generating the firth signal; and
   a simulator coupled to the signal-forming device, the simulator receiving and processing the second signal to provide a fourth signal, the fourth signal being an estimation of the actual position of the positioning unit that control generation of the fifth signal by the signal-forming device.

8. The system as recited in claim 7, wherein the fifth signal is an injection signal, the injection signal depending upon the fourth signal.

9. The system as recited in claim 8, wherein the system further comprises a first adder, the output of the first adder being coupled the input to the loop controller, the first adder receiving the second signal, third signal, and fifth signal.

10. The system as recited in claim 3, wherein the fifth signal depends upon a pseudo system deviation, the pseudo system deviation being the difference between the second signal and the fourth signal.

11. The system as raised in claim 10, wherein the simulator simulates the loop controller and the position unit.

12. The system as recited in claim 7, wherein the fifth signal depends upon the difference between the third signal and the fourth signal.

13. The system as recited in claim 9, wherein the fifth signal is input to the first adder until the third signal matches the fourth signal.

14. The system as recited in claim 9, wherein the system further comprises a logic circuit for preventing the fifth signal from being input to the first adder if there is interference excitation.

15. The system as recited in claim 9, wherein the fifth signal is input to the first adder only when the second signal changes by more than a predetermined amount.

16. The system as recited in claim 10, wherein a transfer characteristic of a signal-forming device depends upon the absolute value of the pseudo system deviation.

17. The system as recited in claim 16, wherein, when the absolute value of the pseudo system deviation is greater than a predetermined value, the transfer characteristic of the signal-forming device demonstrates PT1 action.

18. The system as recited in claim 16, wherein when the absolute value of the pseudo system deviation is less than a predetermine value, the transfer characteristic of the signal-forming device demonstrates PDT1 action.

19. The system as recited in claim 16, wherein the transfer function of the signal-forming device is given by the formula $G(s)=(1+p*s)/(1+q*s)$, with p being a variable depending upon the pseudo system deviation, and q being a constant.

20. The system as recited in claim 16, wherein the signal-forming device includes a logic circuit coupled to a limiter, the limiter being further coupled to an amplifier, the amplifier being further coupled to a switching device, the switching device being further coupled to the logic circuit.

* * * * *

UNITED STATES PATENT AND TRADEMARK OFFICE
CERTIFICATE OF CORRECTION

PATENT NO. : 5,178,111

DATED : January 12, 1993

INVENTOR(S) : Wietelmann et al.

It is certified that error appears in the above-indentified patent and that said Letters Patent is hereby corrected as shown below:

Column 1    line 11, after "adaptively" insert --regulating electromagnetic adjustment of a quantity- --;

Column 3    line 20, change "ii0" to --110--;

Column 8    line 65, change "dedication" to --deviation--;

Column 9    line 17, change "position" to --positioning--;
line 27, change "control" to --controls--;
line 34, after "coupled" insert --to--; same line, change "to" to --of--;

Column 10,    line 1, change "raised" to --recited--;
line 2, change " position" to --positioning--.

Signed and Sealed this

Twenty-fourth Day of May, 1994

Attest:

BRUCE LEHMAN

Attesting Officer    Commissioner of Patents and Trademarks